United States Patent [19]

Rogers

[11] 3,708,936

[45] Jan. 9, 1973

[54] METHOD OF TRIMMING CRYSTALLINE PHOTOSENSOR ARRAYS TO CLOSE TOLERANCES

[75] Inventor: Cedric G. Rogers, Marlborough, Mass.

[73] Assignee: Avco Corporation, Cincinnati, Ohio

[22] Filed: April 22, 1971

[21] Appl. No.: 136,456

[52] U.S. Cl. .......................... 51/310

[51] Int. Cl. .......................... B24c 1/04

[58] Field of Search .............51/8, 310, 312, 319–321

[56] References Cited

UNITED STATES PATENTS

| | | | |
|---|---|---|---|
| 2,548,565 | 4/1951 | Staehle | 51/310 X |
| 2,666,008 | 1/1954 | Enslein | 51/312 X |
| 3,061,422 | 10/1962 | Sato | 51/310 |
| 3,593,459 | 7/1971 | Kulischenko | 51/8 |

*Primary Examiner*—Donald G. Kelly
*Attorney*—Charles M. Hogan

[57] ABSTRACT

The method of effecting exact trimming of the ends of detector sub-arrays which consist of a base upon which a series of tiny infrared mesa-type photodiode elements are arranged in a longitudinally oriented fashion. The method comprises spraying a tiny jet of abrasive particles in a direction perpendicular to the supporting base of the detector sub-array while masking the sensitive detector elements with a thin elastomer strip in order not only to protect the elements themselves from damage, but to define a precise line of cut in the base and provide a true square end edge which will permit a plurality of similar sub-arrays to be accurately aligned longitudinally end to end. Exactness within very close tolerances is required in order to maintain the specified spacing between the individual elements.

3 Claims, 4 Drawing Figures

PATENTED JAN 9 1973 3,708,936

INVENTOR.
CEDRIC G. ROGERS
BY Charles M. Hogan
ATTORNEY.

METHOD OF TRIMMING CRYSTALLINE PHOTOSENSOR ARRAYS TO CLOSE TOLERANCES

BACKGROUND

The surface of a typical indium antimonide diffused junction detector array is covered by several evaporated layers. These are oxide layers designed to accomplish passivation, protection and insulation plus metal layers for contacting to the bonding and area-alignment. To achieve long arrays aligned continuously with very small distances spacing the detector elements, it is necessary to build up a long array from a series of similar sub-arrays, the ends of which must be trimmed accurately to very close tolerances and the trimming and cutting must be very close to the active area of the detector. Lapping and cutting techniques have been utilized for this purpose but these tend to tear the surface layers so that, even though the indium antimonide elements can be trimmed fairly accurately, two- or three-thousandths of an inch of the surface inside the end edge of the array is likely to be found unusable.

Numerous means have been suggested for accurately trimming these end edges, but all have been found unsatisfactory by reason of the failure to achieve effective control, or because the trimming operation damaged the sensitive detector areas mechanically or because excessive heat was used in the abrading phase. In some cases, the base support has become fractured by reason of the vigor of the cutting operation.

It should be borne in mind that the arrays to which the present invention is directed consist of a string of tiny detector elements only a few thousandths of an inch in dimension, which are spaced apart by distances of the order of 0.003 inches. When such a string is to be aligned in a longitudinal row, as is necessary for many application of IR technology, the individual sub-arrays must be cut at their edges to great accuracy — of the order of two thousandths of an inch — and often the actual cut on the edges of the base define an area only one thousandth of an inch from the active area of the first detector element.

Those skilled in the art will recognize that these dimensions are so small that they can be accurately perceived only by microscopic examination. Accordingly there is a need for methods and equipment by which trimming of the type described can be accomplished efficiently and satisfactorily.

BRIEF DESCRIPTION OF DRAWINGS

In the drawings, I have illustrated an exemplary device by which the objectives of the invention are achieved.

DETAILED DESCRIPTION

It will be understood that the device described is shown solely for illustrative purposes and in practice I intend to use much more sophisticated equipment by which the very fine adjustments required may be more easily made.

Figure 1:
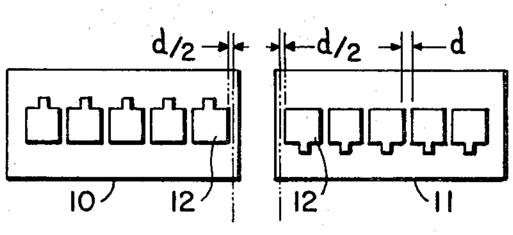
FIG. 1 is a plan view of two infrared detector sub-arrays with their end edges in longitudinal alignment, but spaced apart to show the region where they are intended to abut after they have been accurately trimmed.

Referring more specifically to the drawings, I have shown in FIG. 1 a plan view of two detector sub-arrays, which consist of bases 10 and 11 on which are etched in the form of mesas a series of longitudinally aligned detector elements 12. The length and width of these individual photodiode elements is of the order of three- or four-thousandths of an inch. On account of the small size and spacing of the detector elements, it is not practicable to build an array more than one-half inch or so in length. Accordingly, when it is necessary to construct long arrays of 100 elements or more, a plurality of relatively short sub-arrays can be used which are abutted in a longitudinal alignment.

Figure 2:
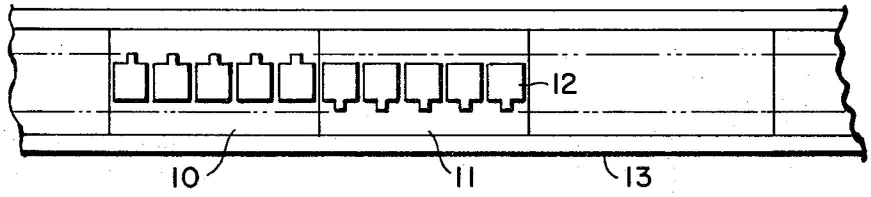
FIG. 2 is a plan view, partly broken away, of a series of such arrays arranged end to end in the precise longitudinal alignment required when they are to be installed in the equipment where they are to be used.

Prior to assembly into the equipment in which they are to be used, the ends of sub-arrays are found to be somewhat ragged and irregular. Consequently, the ends must be sliced or trimmed off square so that one sub-array will fit snugly against the other as depicted by the arrays 10 and 11 in FIG. 2. As shown by the dot and dash lines in FIG. 1, the end edges must be trimmed off perfectly flat so that the distance between the end element 12 of one sub-array and the adjacent end-element of the other sub-array must be a particular distance *d*. Accordingly, the trimming of each sub-array must be accomplished with sufficient precision so that after the trimming operation of the end edges is accomplished, the longitudinal distance between the edge of the nearestmost element 12 to the new edge of each of the sub-arrays must be *d*/2. Since *d* is of the order of the width of a human hair, say, two or three thousandths of an inch, *d*/2 will obviously have to be only one-half of this amount. It will be readily appreciated that extreme care and accuracy is required to accomplish a proper trim.

Figures 3, 4:
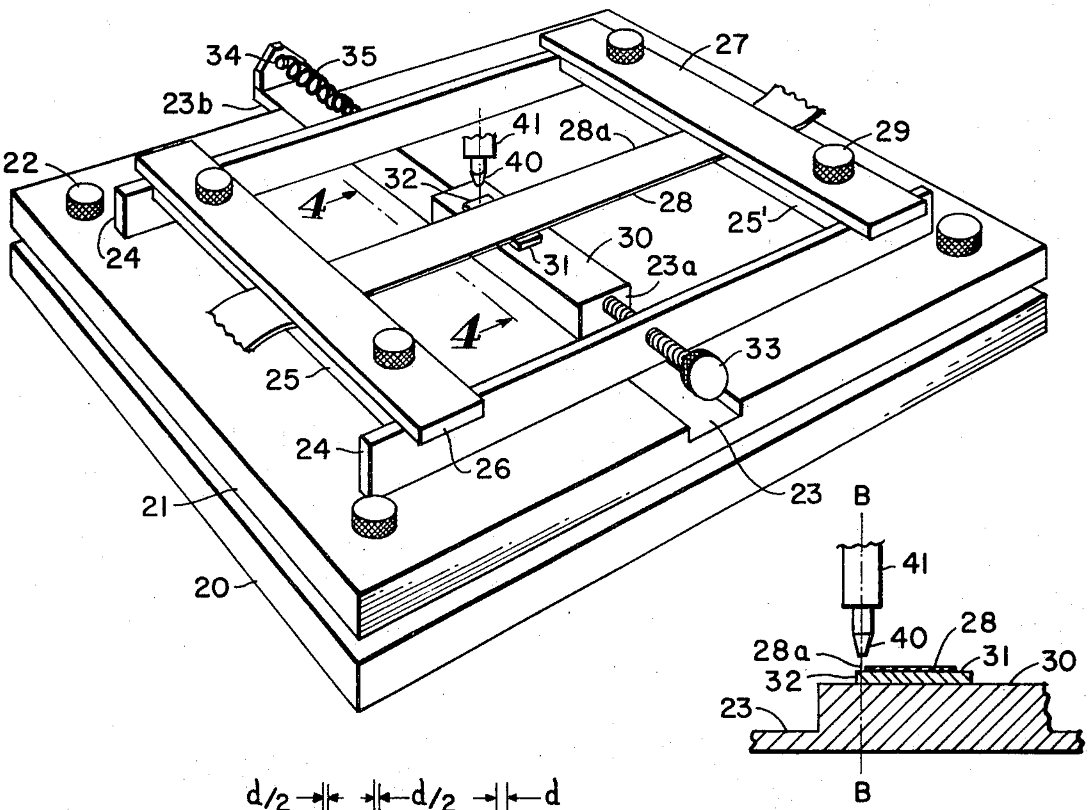
FIG. 3 is the perspective view of an illustrative device (with the cutting jet above it) by which the ends of the sub-arrays may be accurately trimmed.
FIG. 4 is an enlarged fragmentary section taken in the direction of the arrows 4 — 4 of FIG. 3 with the essential parts of the abrasive jet cutting device in operating position.

As previously indicated, the example of FIG. 3 is simply for illustrative purposes and in practice I find that I need more sophisticated equipment, the nature of which will be readily apparent to persons skilled in the art, to permit better control of the fine adjustments necessary on the X and Y axis of the workpiece. In FIG. 3 there is shown a base plate 20 upon which is mounted, preferably through spaced compression spring members (not shown) a movable plate 21, which can be moved vertically with respect to plate 20 by adjustment of knurled knobs 22, the threads on the shanks of the screws operated by knurled knobs being provided with fine threads to permit micro adjustment of the position of plate 21 with respect to plate 20.

Integrally mounted on plate 21 are longitudinal support members 25 extending lengthwise of the plate and to the tops of these supports are secured cross-members 25 and 25'. Supports 24 are aligned precisely parallel to the longitudinal center line of plate 21 and cross-members 25 and 25' are aligned exactly at right angles thereto.

Between members 25 and 25' is clamped a thin strip of elastomer material such as latex about four thousandths of an inch thick in its unstressed state and trimmed to a rectangular shape about 2 inches long and a half inch wide. The strip is stretched to about four times its length and is clamped against cross-members 25 and 25' by clamping members 26 and 27 by suitable means such as threaded screws actuated by knurled knobs 29 from the top of the device. The strip now stretches lengthwise of the device with one edge 28*a* defining a straight line parallel to the longitudinal axis of the device.

Centrally of the plate 21 and crosswise thereof is a slot 23 into which is fitted a slat-shaped strip 23*b* for sliding movement crosswise of the device. Centrally of this strip and secured thereto is a support 30 upon which is mounted a sub-array 31 (similar to those depicted in FIG. 1 as 10 or 11). The strip 23*b* and mount 30 are so arranged that the sub-array 31 is brought directly against the under side of strip 28 for movement at right angles thereto, as shown in FIGS. 3 and 4. The sub-array is suitably mounted on support 30 as by an easily removable cement. A slight downward pressure of strip 28 also tends to hold the workpiece array in fixed position on mount 30.

The end face of mount 30 terminates short of the vertical side of the nearestmost longitudinal support 24 in which is mounted a thumb screw, the end of which abuts the end face. The opposite end of slat 23*b* is provided with a bracket 34 to which is secured a spring 35, the other end of which is secured to a fixed point on the opposite side of the furthermost support 24.

Supported above the device is a nozzle 40 connected by a hose 41 to a miniature sandblaster or similar device (not shown) which produces a fine stream or jet of abrasive particles under pressure.

This stream from nozzle 40 is directed vertically downwardly in the plane B — B (FIGS. 3 and 4). For simplicity of disclosure, the jet stream-producing device is not shown in the drawings, but is well-known to persons skilled in the art. An example of a satisfactory device is one known as an "Airbrasive Unit" manufactured by S. S. White Industrial, a Division of Pennsalt Chemical Corporation, 201 East 42*d* Street, New York, N. Y. 10017. Any convenient means may be provided for mounting this device above or to the side of the fixture shown in FIG. 3, provided only that the nozzle is accurately aligned so that the cutting stream issuing therefrom is at right angles to the edge 28*a* of strip 28 and is directed vertically downwardly so that the protruding portion 32 of the sub-array 31 is trimmed off along the line defined by edge 28*a*. This is shown clearly in FIG. 4. If desired, means may be provided to move the jet stream an arc in a plane perpendicular to the flat surface of strip 28 and in alignment with the defining line 28 *a* as indicated by the plane B — B of FIG. 4.

DISCUSSION

It will be noted that the above described device permits trimming of detector sub-arrays by a method comprised essentially of first constructing a straight edge of a thin strip of elastomer, then aligning and clamping said strip under tension over the detector array to be trimmed, with the end edge of the array extending underneath and beyond the strip with the edge of the strip defining the line to be cut over which the cut is to be made, and finally trimming the end edge square by directing a stream of abrasive particles under pressure in a plane normal to the horizontal face of the strip at the line so defined.

I have found that latex is a practical elastomer that will offer protection from a jet of abrasive particles to a specific part of a sub-array without defacing the surface as a result of the pressure which must exist between the strip and the fragile detector elements thereon in order to hold the array in place.

It will be appreciated that the stressed strip must be aligned so that it is at exact right angles to the detector array which is mounted so that its surface lies just under the strip. After the array has been mounted on the support 30 the knob 33 is manipulated so that the edge of the strip 28 is in alignment with the plane at which the detector is to be trimmed. The positioning of the array with respect to the edge 28*a* which defines the cut is critical and my invention anticipates that micrometer adjustments may be provided in addition to that shown in FIG. 3, but since equipment for making such adjustments is well known to those skilled in the art I have not illustrated any such arrangement in the drawings. Adjustment of the supporting plate vertically permits the sample block to be raised or lowered to insure that the latex mask is firmly pressed over the top of the array and efficient masking maintained of the sensitive electronic elements thereon.

A limit of accuracy of alignment is determined by the ability to see the operation and by the definition of the edge 28*a*. A 100 power microscope was found to give sufficient accuracy and also sufficient depth of focus to see both the edge of the strip and the detector surface. I have found that latex strips can be obtained which are nearly transparent and will permit the portion of the sub-array which is masked to be seen clearly in the microscope as well as the portion to be removed.

It is to be noted that the edge 28*a* of the strip, although defining the line of cut, still limits the accuracy of the cut to plus or minus five ten-thousandths of an inch. Bearing in mind, however, that the detector spacing must always be maintained at close to two-thousandths of an inch, the device and method of the invention still permits much greater accuracy than has heretofore been achieved.

During the operation of the device the nozzle is held at a height of about 2 inches above the surface of the latex and causes very little damage thereto yet at the same time the indium antimonide detector material is abraded to a straight line plus or minus five ten-thousandths of an inch. The abrasive particles used in the equipment are of the order of 10 microns in diameter or less and are made of aluminum oxide.

Having thus described my invention, I claim:

1. The method of trimming a sub-array of photosensitive elements disposed upon a base in aligned longitudinally oriented succession by providing a straight edge of thin elastomer material, accurately aligning and clamping said strip under tension over the array to be trimmed with the end edge of the array extending underneath and beyond said straight edge, micrometrically positioning said end edge so that it extends a predetermined distance from the adjacent sensitive element and finally cutting said extended edge square by directing a stream of abrasive particles in plane perpendicular thereto.

2. The method of claim 1 in which said end is cut and trimmed within a range of tolerance of 0.002 inches.

3. The method of claim 1 in which said end is cut and trimmed within a range of tolerance of 0.002 inches, said strip protecting said elements from damage during said trimming operation.

* * * * *